(12) United States Patent
Kang

(10) Patent No.: US 11,413,943 B2
(45) Date of Patent: Aug. 16, 2022

(54) VEHICLE BODY STRUCTURE OF TAILGATE OPENING

(71) Applicants: HYUNDAI MOTOR COMPANY, Seoul (KR); KIA MOTORS CORPORATION, Seoul (KR)

(72) Inventor: Seung Hyun Kang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 148 days.

(21) Appl. No.: 17/029,327

(22) Filed: Sep. 23, 2020

(65) Prior Publication Data

US 2021/0362571 A1 Nov. 25, 2021

(30) Foreign Application Priority Data

May 25, 2020 (KR) .................... 10-2020-0062099

(51) Int. Cl.
*B62D 33/027* (2006.01)
*B62D 25/08* (2006.01)
*B60J 5/10* (2006.01)
*B62D 33/04* (2006.01)

(52) U.S. Cl.
CPC ............ *B60J 5/107* (2013.01); *B62D 25/087* (2013.01); *B62D 33/0273* (2013.01); *B62D 33/04* (2013.01)

(58) Field of Classification Search
CPC ............... B62D 25/087; B62D 25/088; B62D 25/2027; B62D 21/152; B62D 33/0273; B62D 33/04; B60J 5/107
See application file for complete search history.

(56) References Cited

U.S. PATENT DOCUMENTS

| | | | | |
|---|---|---|---|---|
| 6,364,405 | B1* | 4/2002 | Kim ..................... | B62D 25/087 296/29 |
| 9,126,630 | B1* | 9/2015 | Gallagher ............ | B62D 27/023 |
| 2001/0020796 | A1* | 9/2001 | Delavalle ............. | B62D 25/087 296/193.04 |
| 2007/0085381 | A1* | 4/2007 | Delaney ................ | B62D 25/04 296/193.08 |
| 2010/0072789 | A1* | 3/2010 | Boettcher .......... | B62D 33/0273 296/209 |

(Continued)

FOREIGN PATENT DOCUMENTS

KR 10-1857030 B1 5/2018

*Primary Examiner* — Gregory A Blankenship
(74) *Attorney, Agent, or Firm* — Lempia Summerfield Katz LLC

(57) ABSTRACT

A vehicle body structure of a tailgate opening enhances rigidity and strength of a lower portion of an opening through a change in the vehicle body structure of a tailgate opening. The vehicle body structure includes: a D-pillar member configured to form a closed cross-section structure and vertically installed on each of both sides of a tailgate opening; and a transverse member installed in a lower portion of the tailgate opening in a left-right direction and including side portions at both ends of the transverse member. In particular, the side portions are inserted into a lower end of the D-pillar member such that the side portions are surrounded by and coupled to an inner surface of the lower end of the D-pillar member to form a closed cross-section structure.

13 Claims, 14 Drawing Sheets

(56) References Cited

U.S. PATENT DOCUMENTS

| | | | |
|---|---|---|---|
| 2014/0054928 A1* | 2/2014 | Narahara | B62D 25/087 |
| | | | 296/193.08 |
| 2014/0159428 A1* | 6/2014 | Katou | B62D 25/08 |
| | | | 296/193.08 |
| 2020/0269930 A1* | 8/2020 | Kiyoshita | B62D 25/087 |
| 2020/0290679 A1* | 9/2020 | Sugimoto | B62D 25/087 |
| 2021/0269095 A1* | 9/2021 | Camera | B62D 27/023 |
| 2021/0362571 A1* | 11/2021 | Kang | B62D 25/087 |

\* cited by examiner

VEHICLE BODY STRUCTURE OF TAILGATE OPENING

CROSS REFERENCE TO RELATED APPLICATION

The present application claims priority to and the benefit of Korean Patent Application No. 10-2020-0062099, filed on May 25, 2020, the entire contents of which are incorporated herein by reference.

FIELD

The present disclosure relates to a vehicle body structure of a tailgate opening, which is capable of reinforcing rigidity and strength of a lower portion of an opening through a change in the vehicle body structure of a tailgate opening.

BACKGROUND

The statements in this section merely provide background information related to the present disclosure and may not constitute prior art.

An opening is formed at a rear side of a sport utility vehicle (SUV) or a multi-purpose vehicle (MPV) so as to easily load articles and is configured to be openable and closable at a tailgate.

However, we have discovered that when such a vehicle is parked in a state in which only one front wheel thereof is being placed on a curb, deformation of a vehicle body in a lower portion of the opening becomes excessive so that closing the tailgate may be undermined. In addition, owing to the lack of overall rigidity of the vehicle body, it is difficult to satisfy durability performance of the vehicle body.

In particular, when a four-row pop-up sinking seat is applied to such a vehicle, securing rigidity of a lower portion of a tailgate opening becomes more important so that a vehicle body structure capable of reinforcing rigidity and strength in the lower portion of the opening is desired.

The foregoing is intended merely to aid in the understanding of the background of the present disclosure, and is not intended to mean that the present disclosure falls within the purview of the related art that is already known to those skilled in the art.

SUMMARY

The present disclosure provides a vehicle body structure of a tailgate opening, which is capable of reinforcing rigidity and strength of a lower portion of an opening through a change in the vehicle body structure of a tailgate opening.

According to one aspect, a vehicle body structure includes: a D-pillar member configured to form a closed cross-section structure and vertically installed on each of both sides of a tailgate opening; and a transverse member installed in a lower portion of the tailgate opening in a left-right direction of the vehicle body structure and including side portions at both ends, which are inserted in a form of being surrounded by an interior of a lower end of the D-pillar member to form a closed cross-section structure and to be coupled to an inner surface of the D-pillar member.

The vehicle body structure may further include a back panel installed in a form of covering a rear side and a lower side of the transverse member in a left-right direction; and a cover member coupled in a form of blocking lower ends of the transverse member and a side portion and connected between the back panel and a rear wheel house panel.

The cover member may include a connection member having an intermediate portion of which an upper surface is coupled to the lower end of the side portion of the transverse member, a rear end coupled to an end portion of the back panel, and a front end coupled to a rear end of the rear wheel house panel; and a reinforcement member of which a rear side is covered by the back panel and in which an upper end portion is formed to be bent toward a corner space formed between the connection member, the transverse member, and the side portion so that a bent portion is coupled to the connection member, the transverse member, and the side portion while blocking the corner space.

A pillar outer member constituting an outer surface of the D-pillar member may be formed to extend downward and coupled in a form of covering an outer surface of the connection member, and a rear end of the pillar outer member may be coupled to the end portion of the back panel end and a front end thereof may be coupled to the rear end of the rear wheel house panel.

An upper end and a lower end of the connection member may be formed to be bent outward, and a closed cross-section space may be formed between an outer surface of the intermediate portion of the connection member and an inner surface of the pillar outer member.

The vehicle body structure may further include a rear floor panel configured to constitute a bottom surface of an interior of a vehicle at an inner side of the tailgate opening and having both sides at the rear side, which are formed to extend rearward toward the reinforcement member; a side member coupled at both sides of a lower portion of the rear floor panel in a front-rear direction; and a support member supported between the transverse member and the side member on the rear floor panel and coupled to the connection member.

The support member may include a first support member having an upper end coupled to and supported on bottom surfaces of the transverse member and the side portion and a lower end coupled to an upper surface of the rear floor panel; and a second support member coupled to the upper surface of the rear floor panel and formed in a shape which covers a front side of the first support member to be coupled to the lower ends of the transverse member and the side portion and an inner surface of the connection member.

The first support member may be formed such that supports at both sides of the first support member have a U-shaped cross section which is bent downward; the side member may be formed such that supports at both sides of the side member have a U-shaped cross section which is bent upward; and lower ends of the supports of the first support member and upper ends of the supports of the side member may be connected at positions corresponding to each other by interposing the rear floor panel therebetween.

The supports of the first support member and the supports of the side member may be vertically connected.

A ring-shaped transverse bulkhead may be coupled along edges of inner surfaces of the transverse member and the side portion, and a lower end of the transverse bulkhead may be supported on the transverse member and the side portion which are connected to the upper end of the first support member.

Side ends of the second support member may be formed to extend upward and laterally to be coupled to the lower ends of the transverse member and the side portion and the inner surface of the connection member.

The second support member may be formed in a shape which blocks the front side of the first support member to form a quadrangular first closed cross-section space in the front-rear direction; an extension extending from a side end of the second support member may be formed in a shape which blocks a space between the first support member, the transverse member, the side portion, and the connection member at the front side to form a quadrangular second closed cross-section space in the front-rear direction; and the quadrangular first closed cross-section space and the quadrangular second closed cross-section space may be formed in parallel between the transverse member, the side portion, and the rear floor panel in a left-right direction.

A ring-shaped pillar bulkhead may be coupled along an edge of an inner surface of the D-pillar member, and a lower end of the ring-shaped pillar bulkhead may be coupled to end portions of the transverse member and the side portion which are coupled to an interior of the D-pillar member.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
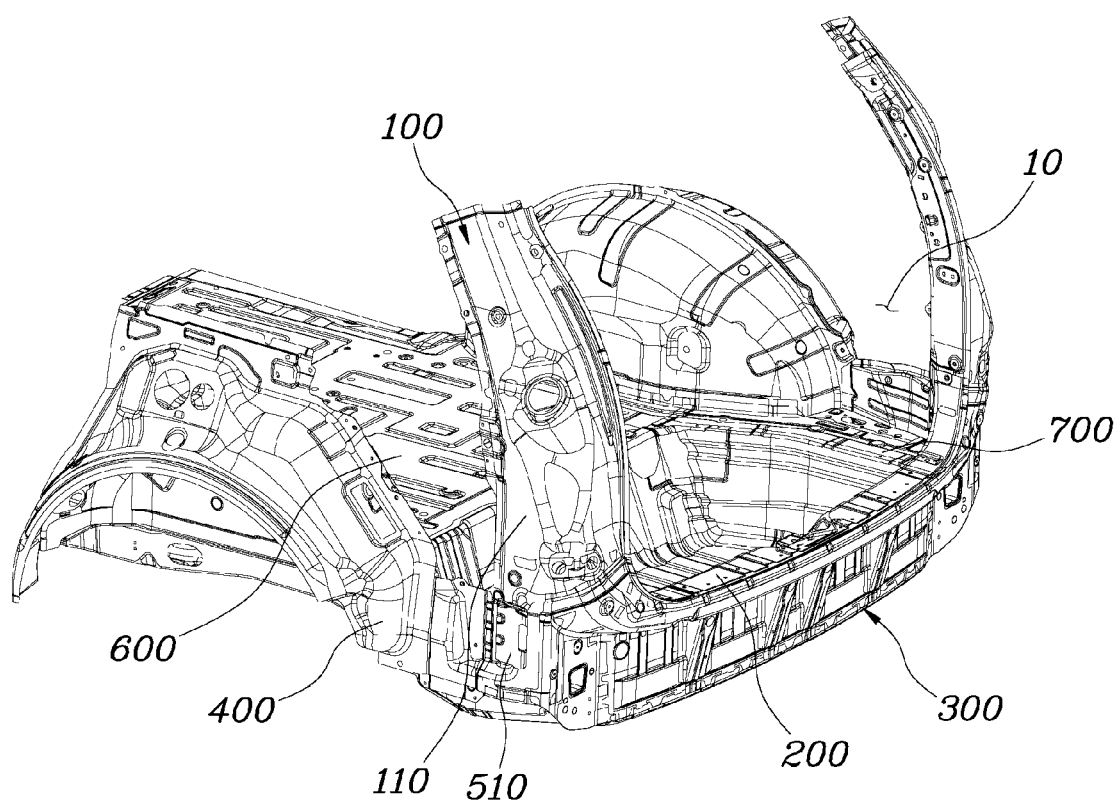
FIG. 1 is a diagram illustrating a vehicle body structure forming a tailgate opening in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will be described below with reference to the accompanying drawings.

Figure 2:
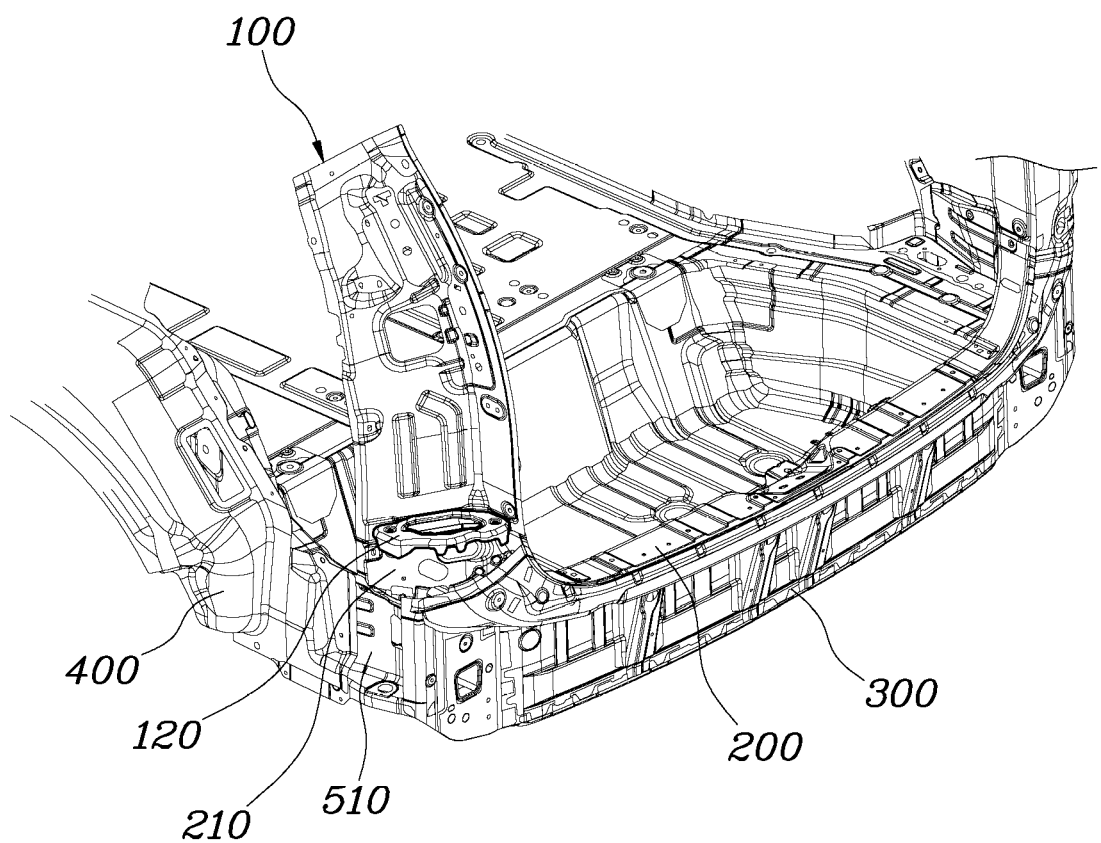
FIG. 2 is a diagram for describing a connection structure between a transverse member and a D-pillar member according to another form of the present disclosure.

FIG. 1 is a diagram illustrating a vehicle body structure forming a tailgate opening 10 according to one form of the present disclosure, and FIG. 2 is a diagram for describing a connection structure between a transverse member 200 and a D-pillar member 100 in one form of the present disclosure.

The present disclosure relates to a vehicle body structure for reinforcing strength and rigidity of a lower portion of the tailgate opening 10 and has a structure in which the transverse member 200, the D-pillar member 100, a back panel 300, and a cover member 500 are organically connected to each other at a corner of a lower end of the tailgate opening 10.

To describe the present disclosure in detail with reference to the drawings, the D-pillar member 100 first forms a closed cross-section structure and is vertically installed on both sides of the tailgate opening 10.

In addition, the transverse member 200 is installed at the lower portion of the tailgate opening 10 in a left-right direction, and side portions 210 at both ends of the transverse member 200 are inserted in the form of being surrounded by an interior of a lower end of the D-pillar member 100 so that a closed cross-section structure is formed and a structure in which the side portions 210 are coupled to inner surfaces of the D-pillar members 100 is formed.

That is, a cross-section of the transverse member 200 is maintained as a closed cross-section, is bent upward from the lower end of the D-pillar member 100, vertically passes through the D-pillar member 100, and is continuously continued to an end of a side wall of the D-pillar member 100 so that cross-section continuity of the transverse member 200 and the D-pillar member 100 is implemented and thus rigidity and strength of a corresponding connection portion is reinforced.

Figure 3:
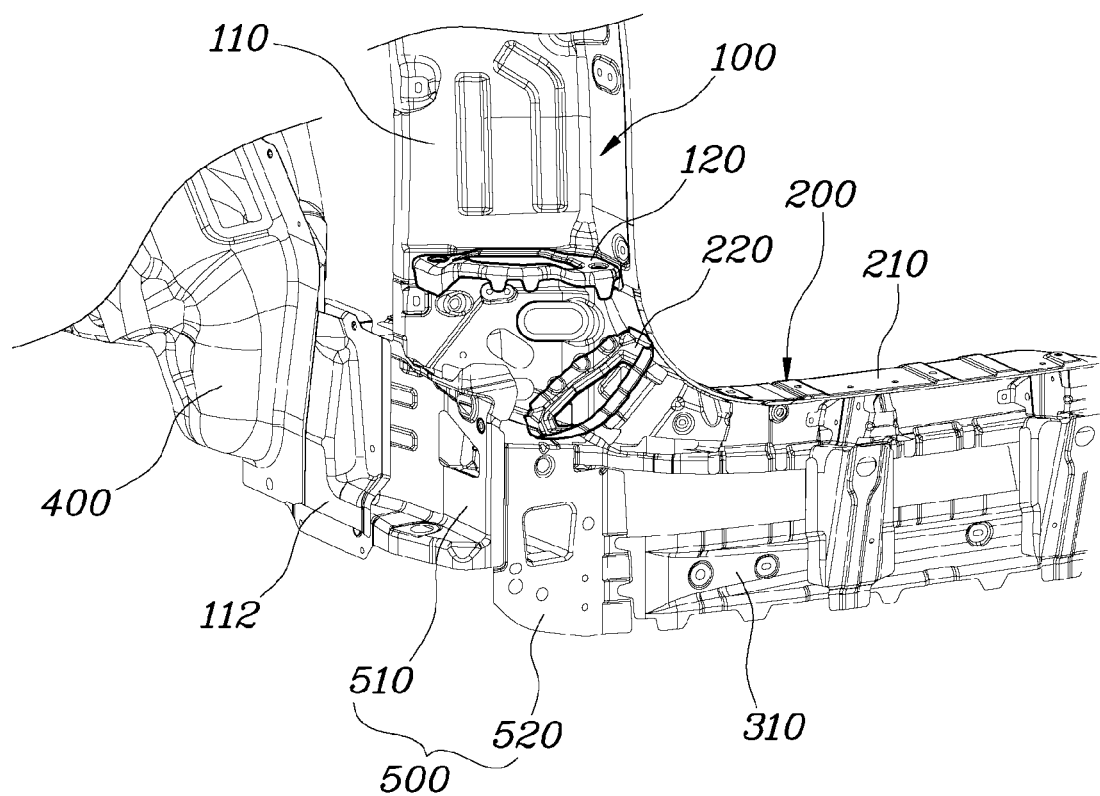
FIG. 3 is a diagram illustrating a vehicle body coupling structure of a corner of a lower end of the tailgate opening according to one form of the present disclosure.
Figure 4:
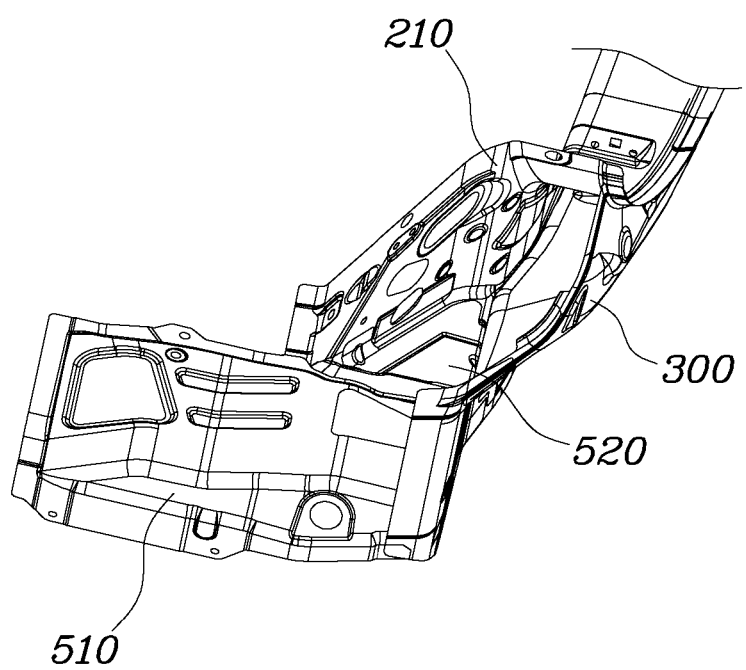
FIGS. 4 to 6 are diagrams respectively illustrating a shape in which a side portion of the transverse member, a connection member, and a reinforcement member are coupled at different positions according to some forms of the present disclosure.
Figure 5:
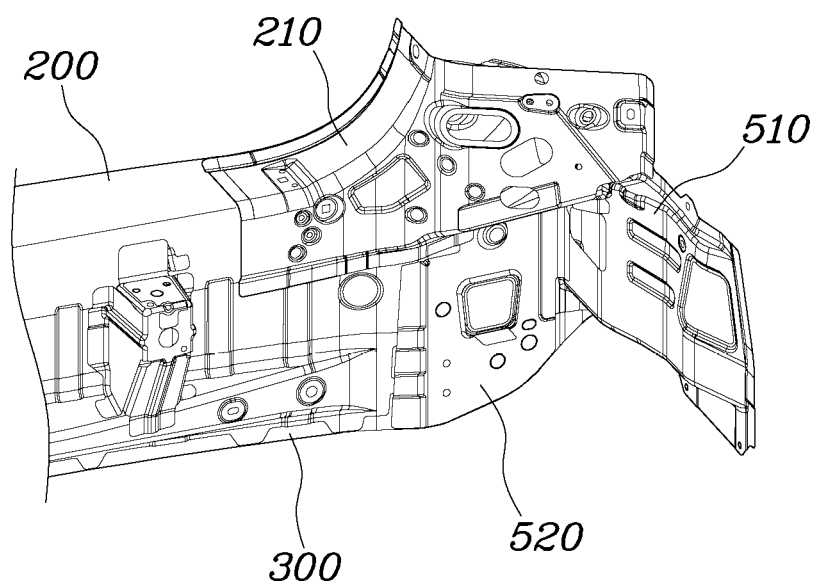
Figure 6:
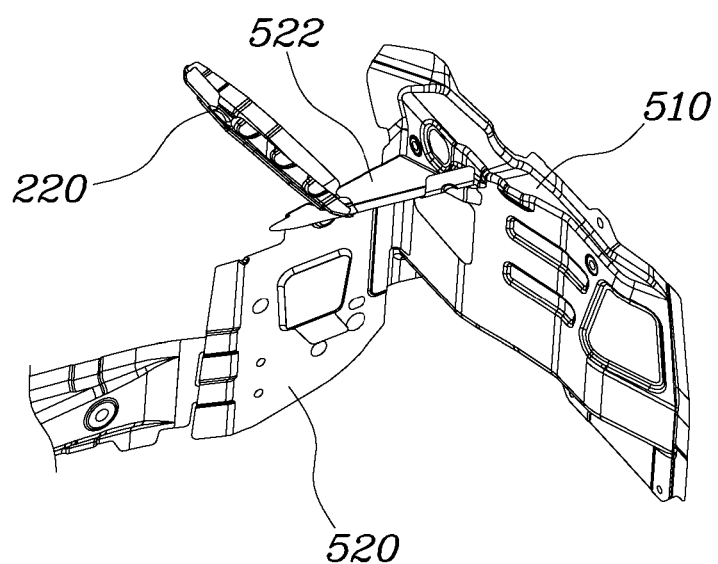

In addition, FIG. 3 is a diagram illustrating a vehicle body coupling structure of a corner of the lower end of the tailgate opening 10, and FIGS. 4 to 6 are diagrams illustrating a shape in which the transverse member 200, a side portion 210, a connection member 510, and a reinforcement member 520 are coupled at different positions.

Referring to the drawings, the back panel 300 is installed in a shape which covers a rear side and a downward side of the transverse member 200 at the lower end of the opening 10 in the left-right direction. For reference, a cross member 310 may be coupled in front of the back panel 300 in the left-right direction.

In addition, the cover member 500 is coupled in the form of blocking lower ends of the side portion 210 of the transverse member 200, and a structure is formed such that the cover member 500 is connected between the back panel 300 and a rear wheel house panel 400.

That is, a corner of the lower portion of the tailgate opening 10 is a position at which various panels and members constituting the vehicle body are connected and, since it is difficult to implement reinforcement of rigidity of the vehicle body or connection of the closed cross-sections, the corner becomes a structurally vulnerable portion.

Thus, as shown in FIG. 3, since a transverse cross section of the transverse member 200 is connected to an inner wall surface of the D-pillar member 100 and the cover member 500 is coupled to the lower end of the transverse member 200 in a front-rear direction and the left-right direction, cross-section continuity is provided in all directions of X, Y, and Z axes at the corner of the lower end of the opening 10 so that stress concentration in the corner may be effectively distributed.

Figure 7:
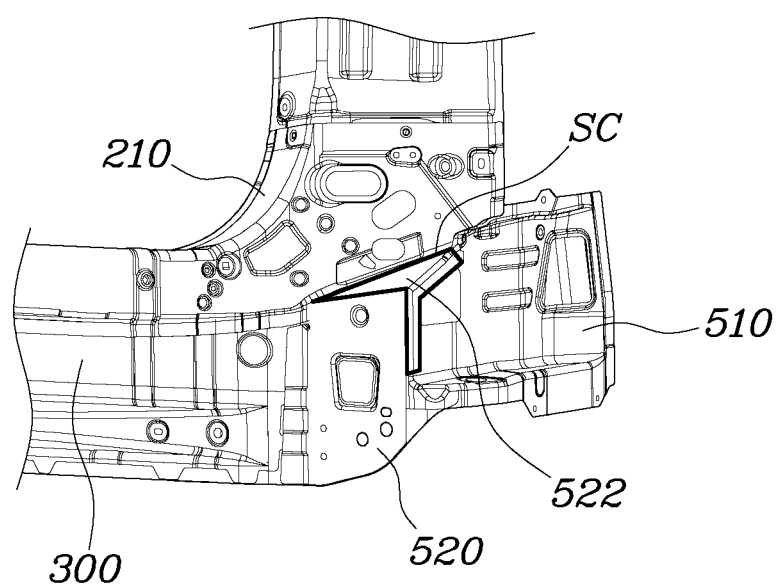
FIG. 7 is a diagram illustrating a coupling relationship between the connection member and the reinforcement member according to one form of the present disclosure.

In addition, FIG. 7 is a diagram illustrating a coupling relationship between the connection member 510 and the reinforcement member 520. The cover member 500 may be formed of a single member. Alternatively, the cover member 500 may be configured in a structure in which the connection member 510 and the reinforcement member 520 are coupled.

To describe with reference to FIGS. 4 to 7, the connection member 510 is formed in a "⊂"-shaped cross section. The lower ends of the side portion 210 of the transverse member 200 are coupled to an upper surface of an intermediate portion of the connection member 510, a rear end of the connection member 510 is coupled to an end of the back panel 300, and a front end of the connection member 510 is coupled to a rear end of the rear wheel house panel 400.

In addition, a rear side of the reinforcement member 520 is covered with the back panel 300, an upper end of the reinforcement member 520 is bent in a "L" shape toward a triangular corner space SC formed between the connection member 510, the transverse member 200, and the side portion 210 to form a bent portion 522, and the bent portion 522 blocks the triangular corner space SC and thus a structure is formed such that the reinforcement member 520 is coupled to the connection member 510, the transverse member 200, and the side portion 210. Moreover, the reinforcement member 520 is coupled in the form of covering a rear side of a side member 700 which will be described below.

That is, the reinforcement member 520 is welded and coupled to the side portion 210 of the transverse member 200 and the connection member 510 at the lower end of the side portion 210 of the transverse member 200, thereby completely blocking the triangular corner space SC. Thus, cross-section connectivity from the transverse member 200 to the connection member 510 is secured as well as rigidity and strength of a corresponding connection portion are reinforced.

Figure 8:
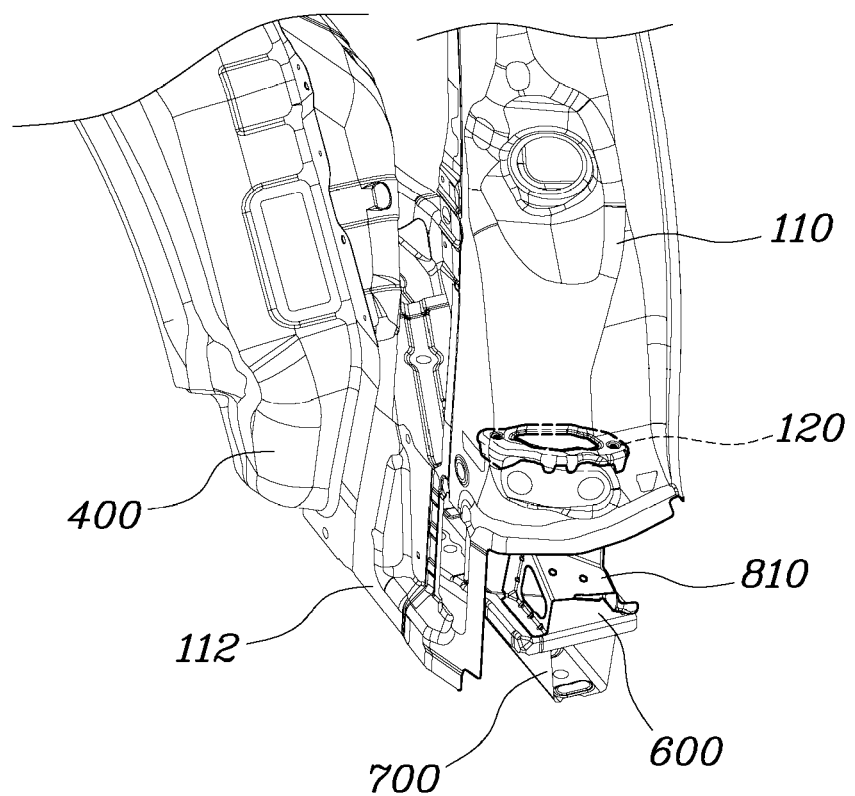
FIG. 8 is a diagram for describing a shape and a coupling relationship of a pillar outer member according to one form of the present disclosure.

Meanwhile, FIG. 8 is a diagram for describing a shape and a coupling relationship of a pillar outer member 110.

To describe with reference to FIG. 3 together with FIG. 8, a portion of the pillar outer member 110 constituting an outer surface of the D-pillar member 100 is formed to extend downward and is coupled in the form of covering a portion of an outer surface of the connection member 510.

In addition, a structure is formed such that a rear end of the pillar outer member 110 is coupled to each of a left end and a right end of the back panel 300 and a front end thereof is coupled to the rear end of the rear wheel house panel 400

In addition, a vertical cross-section of the connection member 510 is formed in a "⊂" shape, and thus a structure is formed such that an upper end and a lower end of the connection member 510 are formed in a shape which is bent outward based on the intermediate portion of the connection member 510, and a closed cross-section space is formed between an outer surface of the intermediate portion of the connection member 510 and the inner surface of the pillar outer member 110.

Figure 9:
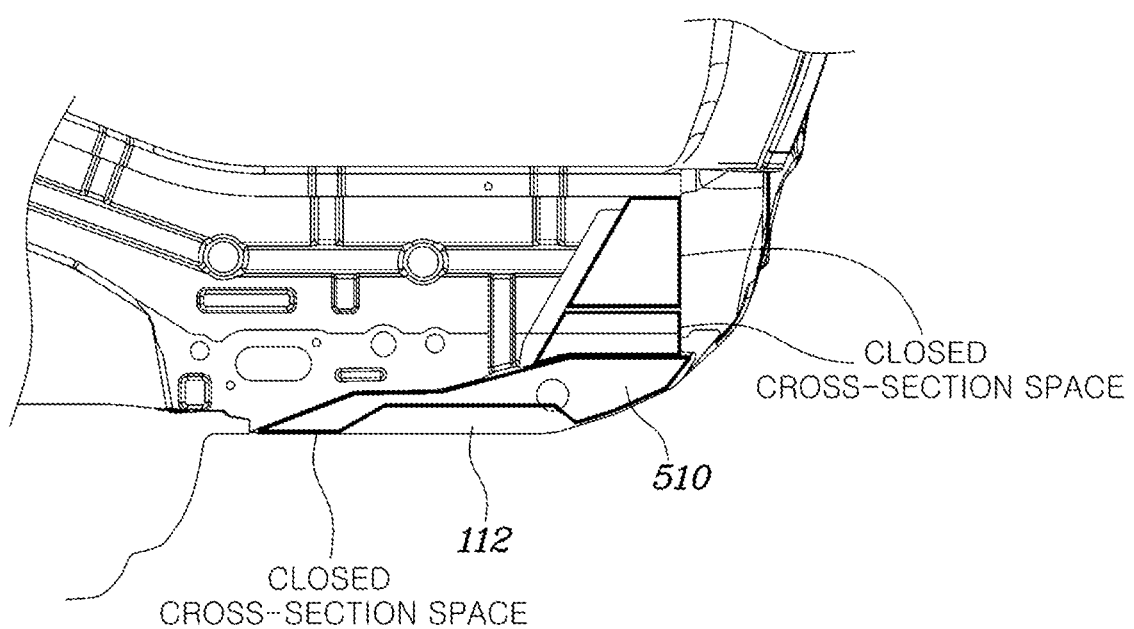
FIG. 9 is a diagram for describing a closed cross-section space formed by coupling the connection member to the pillar outer member according to one form of the present disclosure.

That is, FIG. 9 is a diagram illustrating a shape of the connection member 510 when viewed from the top. A lower end of the pillar outer member 110 is formed to extend downward and is coupled in the form of blocking an outer portion of the connection member 510 so that a closed cross-section space is formed in an area of the intermediate portion of the connection member 510, and thus connectivity of a closed cross-section structure is secured along the connection member 510. Thus, three box structures including two closed cross-section spaces formed at the back side of the back panel 300 are implemented in the corner of the lower end of the opening 10 so that a load is more effectively absorbed and distributed.

Figure 10:
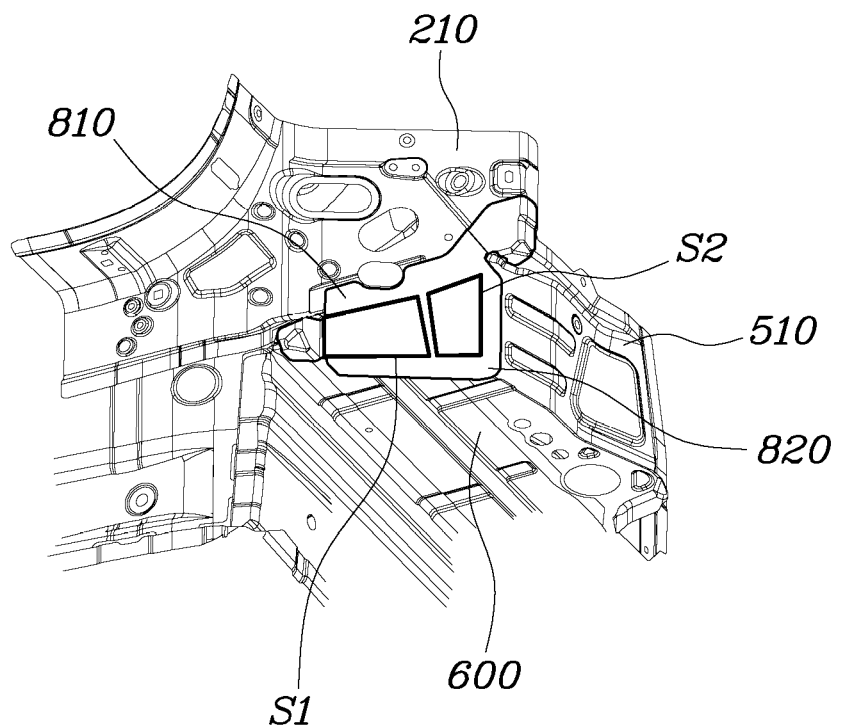
FIG. 10 is a diagram illustrating a coupling relationship between a support member, the side portion of the transverse member, and the connection member according to one form of the present disclosure.
Figure 11:
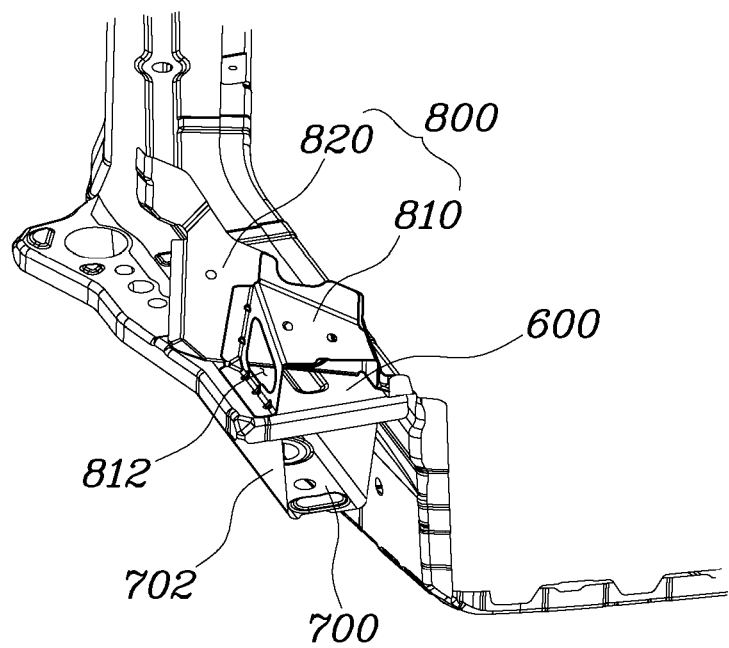
FIG. 11 is a diagram illustrating shapes of a support member and a side member which are coupled to an upper portion and a lower portion of a rear floor panel when viewed from a rear side according to one form of the present disclosure.
Figure 12:
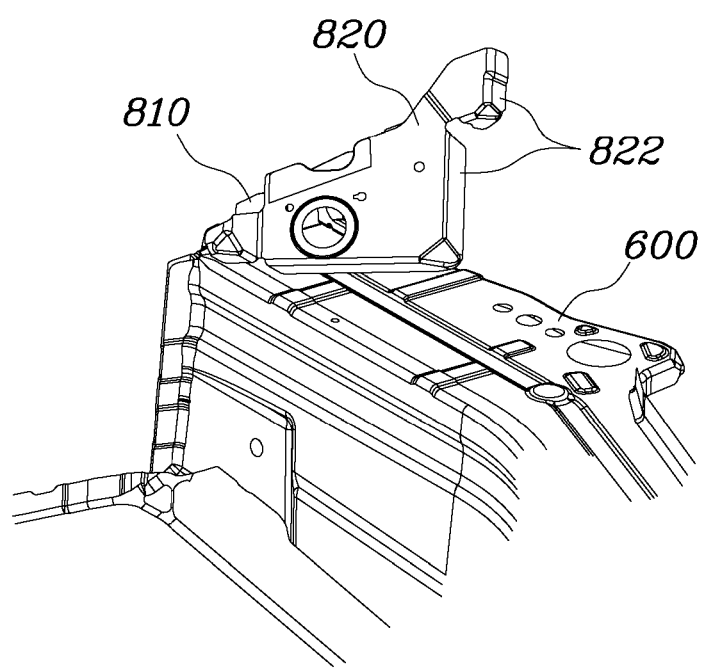
FIG. 12 is a diagram illustrating the shapes of the support member and the side member which are coupled to the upper portion and the lower portion of the rear floor panel when viewed from the rear side according to one form of the present disclosure.

Meanwhile, FIG. 10 is a diagram illustrating a coupling relationship between a support member 800, the side portion 210 of the transverse member 200, and the connection member 510, and FIGS. 11 and 12 are diagrams illustrating shapes of the support member 800 and the side member 700 which are coupled to an upper portion and a lower portion of a rear floor panel 600 when viewed from the rear side and the front side. A structure is formed such that the support member 800 is coupled to the upper portion of the rear floor panel 600, and the side member 700 is coupled to the lower portion of the rear floor panel 600.

To describe with reference to the drawings, the rear floor panel 600 is formed to constitute a vehicle floor surface from an inner side of the tailgate opening 10, and both rear sides of the rear floor panel 600 are formed to extend to be long in a rear direction toward the reinforcement member 520. For reference, a rear intermediate portion of the rear floor panel 600 is formed to be recessed downward so that a space for accommodating a four-row pop-up sinking sheet may be formed.

In addition, the side member 700 is coupled at both sides of the lower portion of the rear floor panel 600 in the front-rear direction.

In addition, a structure is formed such that, in the upper portion of the rear floor panel 600, the support member 800 is supported between the transverse member 200 and the side member 700, and coupled to the connection member 510.

That is, rear ends of both sides of the rear floor panel 600 are formed to extend to be long in the rear direction and connected to the reinforcement member 520 so that noise introduced from the lower portion to the upper portion of the rear floor panel 600 in the extending portion thereof is blocked such that sealing robustness of the vehicle body may be secured as well as waterproof performance may be improved.

In addition, the support member 800 is supported between the rear floor panel 600 and the side portion 210 and the transverse member 200, as well as coupled to an inner side of the connection member 510 to improve coupling rigidity between the transverse member 200 and the connection member 510 which are coupled to the rear floor panel 600 so that it is possible to further improve the rigidity and strength of the corner of the lower end of the opening 10.

In addition, as shown in FIGS. 11 and 12, the support member 800 may be formed of a single member. In one form, the support member 800 may be configured in a structure in which a first support member 810 and a second support member 820 are coupled.

Referring to the drawings, an upper end of the first support member 810 is first coupled to support bottom surfaces of the side portion 210 of the transverse member 200, and a lower end thereof is coupled to an upper surface of the rear floor panel 600.

In addition, the second support member 820 is formed in a shape which is coupled to the upper surface of the rear floor panel 600 and covers a front side of the first support member 810 so that a structure is formed such that the second support member 820 is coupled to the lower end of the side portion 210 of the transverse member 200 and an inner surface of the connection member 510.

In particular, supports 812 at both sides of the first support member 810 are formed to have a "U"-shaped cross section which is bent downward, and supports 702 at both sides of the side member 700 are formed to have a "U"-shaped cross section which is bent upward.

Thus, a structure is formed such that lower ends of the supports 812 of the first support member 810 and upper ends of the supports 702 of the side member 700 are connected to positions corresponding to each other by interposing the rear floor panel 600 therebetween.

In another form, a structure is formed such that the supports 812 of the first support member 810 and the supports 702 of the side member 700 are vertically connected.

Figure 13:
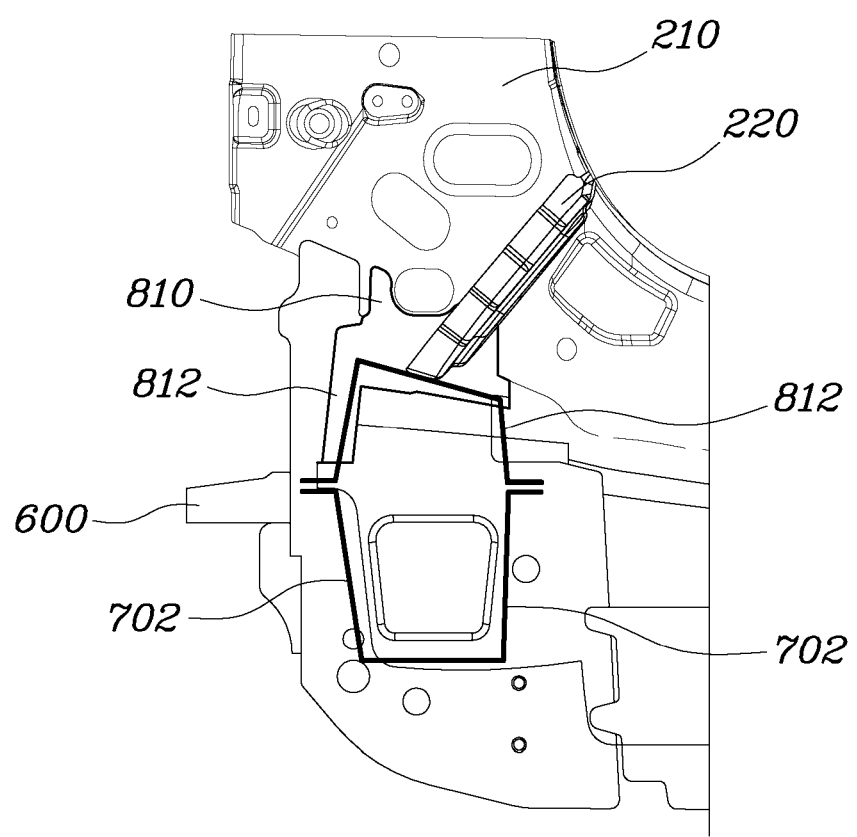
FIG. 13 is a diagram for describing a cross-sectional connection structure between the support member and the side member and a structure in which a transverse bulkhead is coupled according to one form of the present disclosure.

That is, FIG. 13 illustrates a cross-sectional connection structure between the support member 800 and the side member 700. A double support structure of the first support member 810 and the second support member 820 is applied on the side member 700, and the lower ends of the supports 812 of the first support member 810 and the upper ends of the supports 702 of the side member 700 are vertically connected by interposing the rear floor panel 600 therebetween so that cross-section connectivity of the side member 700 may become robust.

Therefore, coupling rigidity between parts connected from the side member 700 to the transverse member 200 is increased so that the rigidity and strength of the corner of the lower end of the opening 10 may be enhanced.

In addition, to describe a structure in which a transverse bulkhead 220 is coupled with reference to FIG. 13, a ring-shaped transverse bulkhead 220 is coupled along an inner peripheral surface of the side portion 210 of the transverse member 200.

In addition, a structure is formed such that a lower end of the transverse bulkhead 220 is supported on the side portion 210 of the transverse member 200 which are connected to the upper end of the first support member 810.

That is, the transverse bulkhead 220 is coupled along the edge of the inner surface of the transverse member 200 so that rigidity of the transverse member 200 is reinforced.

In particular, since the lower end of the transverse bulkhead 220 is supported on the first support member 810, a load transmitted from the side member 700 to the transverse member 200 is transmitted to the D-pillar member 100 through the first support member 810 and the transverse bulkhead 220 so that it is possible to more effectively distribute a load introduced from the outside of the vehicle.

Subsequently, referring to FIG. 10, side ends of the second support member 820 are formed to extend upward and laterally so that a structure is formed such that the second support member 820 is coupled to the lower end of the side portion 210 of the transverse member 200 and the inner surface of the connection member 510.

Specifically, the second support member 820 is formed in a shape which blocks the front side of the first support member 810 so that a quadrangular first closed cross-section space S1 is formed in the front-rear direction.

In addition, an extension 822 extending from a side end of the second support member 820 is foamed in a shape which blocks a space between the first support member 810, the side portion 210 of the transverse member 200, and the connection member 510 at the front side so that a quadrangular second closed cross-section space S2 is formed in the front-rear direction.

Thus, a structure is formed such that the first closed cross-section space S1 and the second closed cross-section space S2 are formed in parallel between the side portion 210 of the transverse member 200 and the rear floor panel 600 in the left-right direction.

That is, the second support member 820 is coupled in the form of surrounding the first support member 810 at the front side thereof to form one closed cross-section space, and the second support member 820 is formed and coupled to extend toward the side portion 210 of the transverse member 200 and the connection member 510 on the rear floor panel 600 to form another one closed cross-section space.

Therefore, the closed cross-section spaces of a two-box structure are foamed in parallel between the transverse member 200 and the rear floor panel 600 in the left-right direction so that connectivity of the closed cross-section spaces is secured. Consequently, coupling rigidity between the transverse member 200 and the rear floor panel 600 is increased so that it is possible to more effectively distribute a load introduced from the outside.

Figure 14:
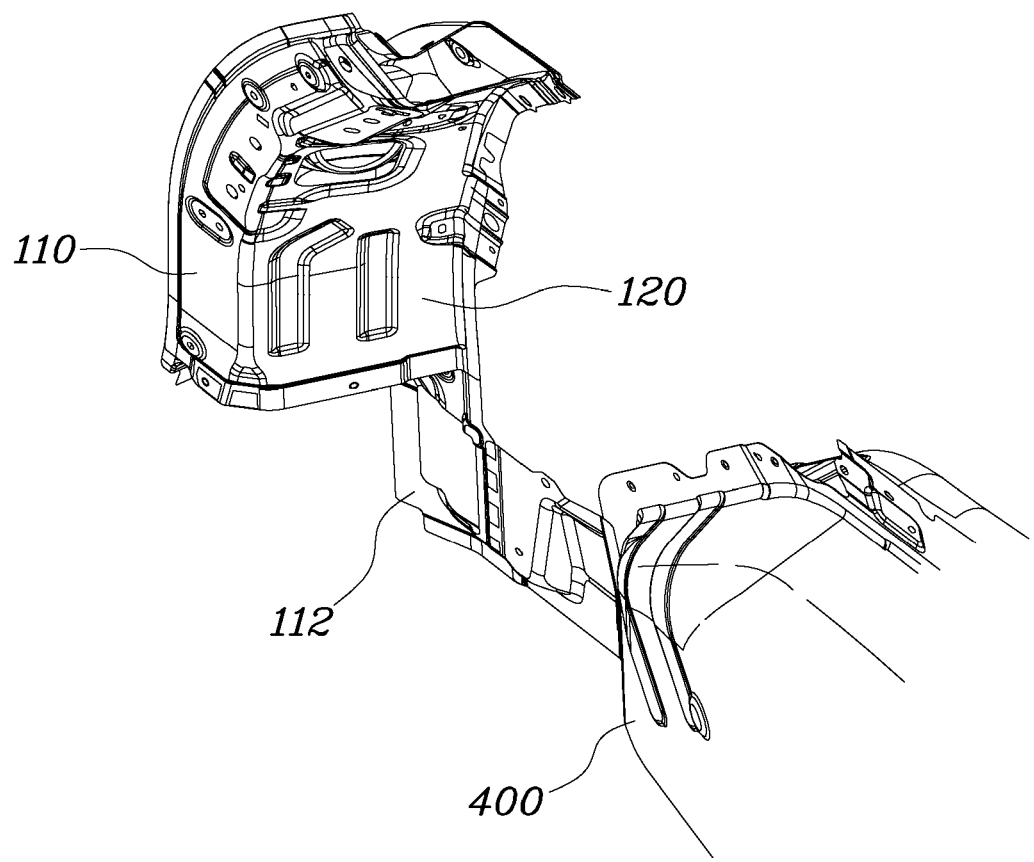
FIG. 14 is a diagram for describing a structure in which a pillar bulkhead is coupled according to one form of the present disclosure.

Meanwhile, FIG. 14 is a diagram for describing a structure in which a pillar bulkhead 120 is coupled according to the present disclosure.

Referring to the drawing, a ring-shaped pillar bulkhead 120 is coupled along an edge of the inner surface of the D-pillar member 100.

In addition, a structure is formed such that a lower end of the pillar bulkhead 120 is coupled to an end portion of the side portion 210 of the transverse member 200 which are coupled to the interior of the D-pillar member 100.

That is, the pillar bulkhead 120 is coupled along the edge of the inner surface of the D-pillar member 100 so that rigidity of the transverse member 200 is reinforced.

In particular, the side portion 210 of the transverse member 200 is supported on the lower end of the pillar bulkhead 120 so that it is possible to effectively distribute stress concentration and a load transmitted from the transverse member 200 to the D-pillar member 100.

As described above, the present disclosure provides cross-section continuity in all directions of the X, Y, and Z axes through a coupling structure between members including the transverse member 200, the connection member 510, and the reinforcement member 520 at the corner of the lower end of the tailgate opening 10 as well as effectively distributes a load and stress concentration through an improved combination between the transverse bulkhead 220, the pillar bulkhead 120, and the support member 800, thereby inhibiting or preventing deformation of the vehicle body.

Therefore, the rigidity and strength of the tailgate opening is enhanced and displacement of the opening 10 is reduced or minimized so that a cause of poor closing of the tailgate is removed. In addition, owing to the enhancement of overall rigidity of a rear end portion of the vehicle body, a ride & handling (R&H) characteristic may be improved.

In accordance with the present disclosure, cross-section continuity in all directions of the X, Y, and Z axes can be provided through a coupling structure between members including a transverse member, a connection member, and a reinforcement member at a corner of a lower end of a tailgate opening as well as a load and stress concentration can be effectively distributed through an improved combination between a transverse bulkhead, a pillar bulkhead, and a support member so that deformation of a vehicle body can be inhibited or prevented.

Therefore, the enhanced rigidity and strength of the tailgate opening can reduce or minimize displacement of the opening so that a cause of poor closing of a tailgate can be removed, and owing to the enhancement of overall rigidity of a rear end portion of a vehicle body, a R&H characteristic can be improved.

Meanwhile, although the present disclosure has been described in detail with respect to only the above described specific examples, it is obvious to those skilled in the art that various modifications and alternations are possible within the technical scope of the present disclosure, and it is natural that such modifications and alternations fall within the present disclosure.

What is claimed is:

1. A vehicle body structure of a tailgate opening, comprising:
   a D-pillar member having a closed cross-section and vertically installed on each of both sides of a tailgate opening; and
   a transverse member installed in a lower portion of the tailgate opening along a left-right direction of the vehicle body structure and including side portions at both ends of the transverse member, wherein the side portions are inserted into a lower end of the D-pillar member such that the side portions are surrounded by and coupled to an inner surface of the lower end of the D-pillar member and form a closed cross-section structure.

2. The vehicle body structure of claim 1, further comprising:
   a back panel configured to cover a rear side and a lower side of the transverse member and installed along the left-right direction; and
   a cover member configured to connect the back panel to a rear wheel house panel and coupled to a lower end of the transverse member,
   wherein the cover member is configured to block a lower end of a side portion of the transverse member.

3. The vehicle body structure of claim 2, wherein the cover member includes:
   a connection member including: an intermediate portion of which an upper surface is coupled to the lower end of the side portion of the transverse member, a rear end coupled to an end portion of the back panel, and a front end coupled to a rear end of the rear wheel house panel; and
   a reinforcement member of which a rear side is covered by the back panel and in which an upper end portion is formed to be bent toward a corner space formed between the connection member and the side portion of the transverse member to form a bent portion, wherein the bent portion is configured to block the corner space and coupled to the connection member and the side portion of the transverse member.

4. The vehicle body structure of claim 3, wherein:
   a pillar outer member forming an outer surface of the D-pillar member is configured to: extend downward and cover an outer surface of the connection member;
   a rear end of the pillar outer member is coupled to the end portion of the back panel; and
   a front end of the pillar outer member is coupled to the rear end of the rear wheel house panel.

5. The vehicle body structure of claim 4, wherein:
   an upper end and a lower end of the connection member are formed to be bent outward; and
   a closed cross-section space is famed between an outer surface of the intermediate portion of the connection member and an inner surface of the pillar outer member.

6. The vehicle body structure of claim 3, further comprising:
   a rear floor panel configured to form a bottom surface of an interior of a vehicle on an inner side of the tailgate opening and having first and second sides which are configured to extend rearward toward the reinforcement member;
   a side member coupled at both sides of a lower portion of the rear floor panel in a front-rear direction of the vehicle body structure; and
   a support member supported between the transverse member and the side member on the rear floor panel and coupled to the connection member.

7. The vehicle body structure of claim 6, wherein the support member includes:
   a first support member including: an upper end coupled to and supported on bottom surfaces of the transverse member and the side portion, and a lower end coupled to an upper surface of the rear floor panel; and
   a second support member coupled to the upper surface of the rear floor panel and formed in a shape which covers a front side of the first support member to be coupled to the lower end of the side portion of the transverse member and an inner surface of the connection member.

8. The vehicle body structure of claim 7, wherein:
   the first support member includes supports on both sides of the first support member, wherein the supports of the first support member have a U-shaped cross section which is bent downward;
   the side member includes supports on both sides of the side member, the supports of the side member have a U-shaped cross section which is bent upward; and
   lower ends of the supports of the first support member and upper ends of the supports of the side member are connected at positions corresponding to each other by interposing the rear floor panel therebetween.

9. The vehicle body structure of claim 8, wherein the supports of the first support member and the supports of the side member are vertically connected.

10. The vehicle body structure of claim 7, wherein:
    a ring-shaped transverse bulkhead is coupled along an edge of an inner surface of the side portion of the transverse member; and
    a lower end of the ring-shaped transverse bulkhead is supported on the transverse member and the side portion, which are connected to the upper end of the first support member.

11. The vehicle body structure of claim 7, wherein side ends of the second support member are formed to extend upward and laterally to be coupled to the lower end of the side portion of the transverse member and the inner surface of the connection member.

12. The vehicle body structure of claim 11, wherein:
the second support member is formed in a shape which blocks the front side of the first support member to form a quadrangular first closed cross-section space in the front-rear direction;
an extension extending from a side end of the second support member is formed in a shape which blocks a space between the first support member and the side portion of the transverse member, and the connection member at the front side to form a quadrangular second closed cross-section space in the front-rear direction; and
the quadrangular first closed cross-section space and the quadrangular second closed cross-section space are formed in parallel between the side portion of the transverse member and the rear floor panel in the left-right direction.

13. The vehicle body structure of claim 3, wherein:
a ring-shaped pillar bulkhead is coupled along an edge of an inner surface of the D-pillar member; and
a lower end of the ring-shaped pillar bulkhead is coupled to the lower end of the side portion of the transverse member which is coupled to an interior of the D-pillar member.

* * * * *